United States Patent [19]

Liebermann

[11] Patent Number: 4,597,711

[45] Date of Patent: Jul. 1, 1986

[54] DEVICE TO FACILITATE CHANGING TIRES

[76] Inventor: Hanne Liebermann, Erbstrasse 2a, 8700 Kusnacht, Switzerland

[21] Appl. No.: 569,859

[22] Filed: Jan. 11, 1984

[30] Foreign Application Priority Data

Jan. 13, 1983 [CH] Switzerland .................. 183/83

[51] Int. Cl.$^4$ ............................................. B62D 43/04
[52] U.S. Cl. ................................. 414/427; 414/466; 414/500
[58] Field of Search ............ 414/426, 427, 428, 429, 414/430, 463, 464, 465, 466, 467, 498, 500

[56] References Cited

U.S. PATENT DOCUMENTS

| | | | |
|---|---|---|---|
| 2,516,260 | 7/1950 | Schildmeier | 414/427 |
| 2,545,440 | 3/1951 | Barber | 414/427 |
| 2,797,004 | 6/1957 | Miller | 414/427 |
| 3,850,321 | 11/1974 | Virnig | 414/428 X |
| 3,951,287 | 4/1976 | Cofer | 414/428 X |
| 4,449,881 | 5/1984 | Lane | 414/500 X |

FOREIGN PATENT DOCUMENTS 912664 5/1954 Fed. Rep. of Germany .
1480858 9/1971 Fed. Rep. of Germany .
3118504 11/1982 Fed. Rep. of Germany .

Primary Examiner—Robert J. Spar
Assistant Examiner—Stuart J. Millman
Attorney, Agent, or Firm—Bernard, Rothwell & Brown

[57] ABSTRACT

The spare tire of a motor vehicle is placed in a holder which (1) can be lifted to or lowered from a storage position under the vehicle, (2) rolled on running wheels to carry the tire to a position adjacent an axle hub, and (3) operated to raise or lower a tire relative to an axle hub. The holder has a pair of horizontal, spaced rollers upon which a tire is carried. These rollers are mounted on a vertically raisable frame which in one embodiment has vertical slide bars slidingly extending through vertical tubular guides mounted on a wheeled dolly frame. Hand wheel operated screws and hydraulic jacks are provided in respective embodiments for raising and lowering the frame supporting the tire. In attaching the holder at a storage location on the vehicle, the upper end of the holder is first attached and then a winch is used to raise the lower end so that the holder pivots to a horizontal storage position under the vehicle.

10 Claims, 6 Drawing Figures

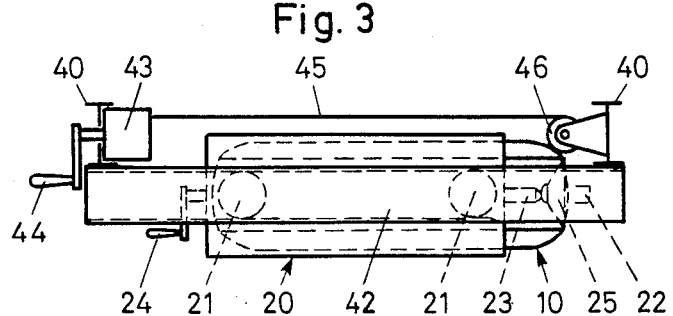
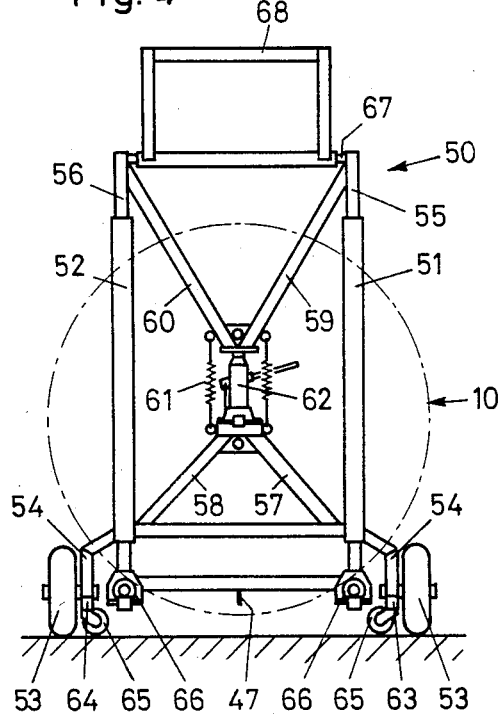
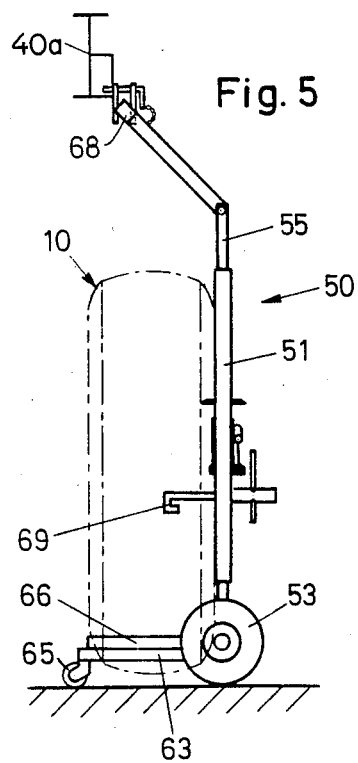
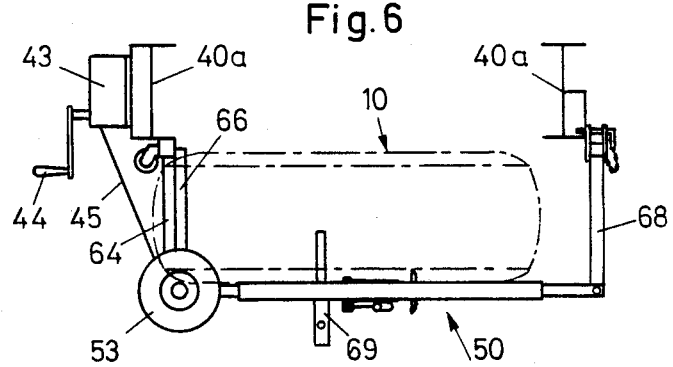

DEVICE TO FACILITATE CHANGING TIRES

The present invention involves a device to facilitate handling and changing tires on a vehicle, and particularly on larger vehicles, such as trucks, where each tire and its wheel weighs more than 50 kg.

Changing a truck tire on the road is difficult due to the high weight of the tire and wheel, which may weigh in the range of 150–180 kg. Great exertion is usually required by the driver to get the spare tire out of its storage place which is generally inconveniently located. When inserting the heavy wheel on the axle hub, the driver either has to adjust the height of the hub to the wheel with the jack, which takes a great deal of time, or he must lift and rotate the tire and wheel to the proper height and orientation in order to match the hub bolts or studs to the corresponding wheel holes. Finally the defective tire has to be put back in the storage place for the spare wheel.

In the accident prevention regulations of the Federal Republic of Germany dated Apr. 1, 1980, it is stated under Chapter 22.0 "Vehicles" in Paragraph 5: "Spare wheels must be able to be removed and replaced by only one employee." For the occasional lifting of weights the maximum lifting and carrying capacity for men is given as 50 kg. Through this regulation and limitation a means of assistance for the truck driver in changing tires is indirectly demanded.

In the German Pat. No. DE-A 31 18 504 a device is presented with which heavy spare tires can be transported and mounted. According to this German patent, the spare tire is hung in a basket that runs on rollers. Hooks are placed on both sides of the basket at about half the height of the spare tire for hanging the basket on brackets on the vehicle. Thereby a spare tire and basket can be pivoted from a horizontal position underneath the vehicle and brought to a vertical position with only a small exertion and the basket with the spare tire can be pushed like a wheelbarrow to a repair place using the available rollers. To mount the tire, however, the openings in the tire wheel must be aligned with the hub fasteners by lifting and rotating the tire or by adjusting the hub height with the jack; adjusting the jack can be arduous because the truck jack must usually be placed in a position spaced from the wheel so that one cannot simultaneously observe the opposing positions of the hub and wheel openings. With this device, it is difficult to rotate the tire in order to orient wheel holes with the hub bolts.

There is therefore still a need for a means of assistance with which a defective tire can be replaced by a spare tire without great exertion. Accordingly, the object of the invention is to create such a means of assistance.

Constructional examples of the invention are described below with the aid of drawings, wherein:

FIG. 3 is a view of the device of FIG. 1 with a tire placed under the vehicle in the storage position.

FIG. 4 is a front view of a second embodiment of a device according to the invention.

FIG. 5 is a side elevation of the device of FIG. 4.

FIG. 6 is a view similar to FIG. 3 but of the device of FIG. 4 with a tire placed under the vehicle.

Figure 1:
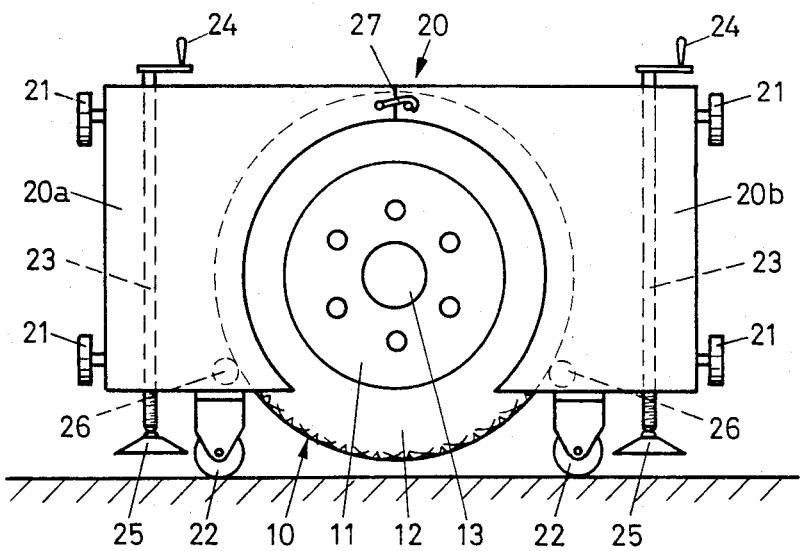
FIG. 1 is a front view of one embodiment of a tire changing device in accordance with the invention.

As shown in FIG. 1, a spare tire 10 consists of a wheel 11 and a rubber tire 12 mounted on the rim of the wheel. The spare tire 10 is housed in a holder 20 which has the general shape of a box. Horizontal carrier rollers 26 are mounted across the bottom portion from the front to the back of the holder 26 for rotatably supporting the tire 10. Two pairs of rollers 21 are mounted on respective opposite sides of the holder, and two wheels or casters 22 are mounted on the bottom of the holder 20 for rolling along the ground; the casters 22 may be pivotally mounted so that they may swivel about a vertical axis to enable easier directing of the holder. The wheels 22 are spaced on outer sides of the carrier rollers 26 for providing stability to the holder during movement thereof. In addition, there is a threaded vertical spindle or screw 23 on each side with a top hand wheel 24 and a bottom foot 25. The holder 20 is open on both front and back sides in the vicinity of the hub opening 13 and surrounding bolt openings of the wheel 11 and over part of the tire 12; these open front and back sides can be closed with a cover (not shown). The wheel holder 20 is advantageously divided into two parts and including two shell halves 20a and 20b. A securing hook 27 on the front side and known slide devices (not shown) on the rear side make it possible to separate the halves 20a and 20b to remove the wheel-holder 20 from a mounted wheel.

Figure 2:
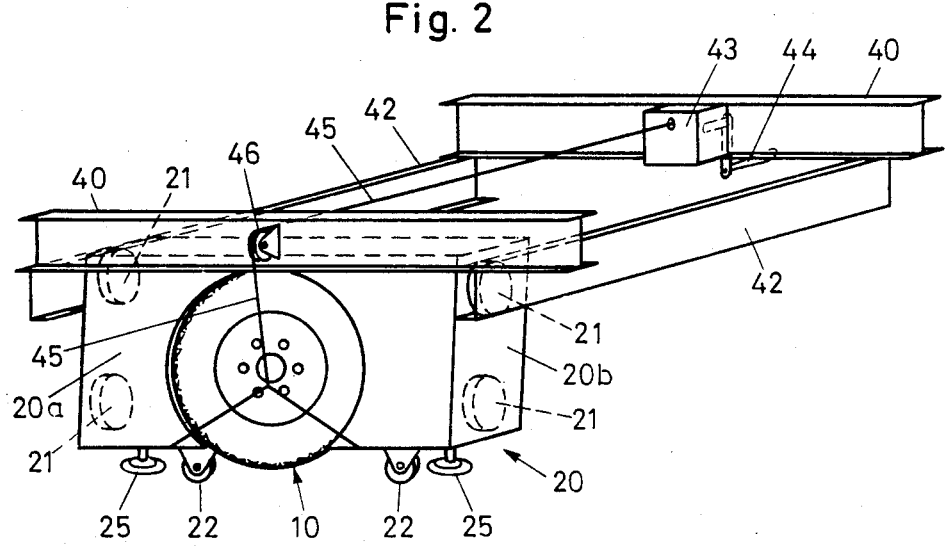
FIG. 2 is a perspective view of the device of FIG. 1, in a position hung on the vehicle and in a reduced scale.

Under the frame 40, FIGS. 2 and 3, of a motor vehicle two parallel horizontal rails 42 are mounted for receiving the rollers 21. When not in use, the tire 10 in the wheel-holder 20 lies horizontal under the vehicle 40, supported by the rollers 21 in the rails 42 as shown in FIG. 3. With the rollers 21 inserted in the two rails 42, the holder 20 with the spare tire 10 can be pushed horizontally. When a tire is to be changed, the bottom end of the holder 20 is pulled out of the rails 42 and the running wheels 22 are lowered to the ground, as FIG. 2 shows. The rails 42 are positioned at a distance from the ground that is equal to or less than the distance between the running wheels 22 and the upper pair of rollers 21, so that the wheels 22 engage the ground when the holder 20 is in a vertical position with the upper rollers 21 in the rails 42.

For aiding in raising and lowering the holder 20 from the rails 42, a hand winch 43 with a hand crank 44 are fitted on the vehicle 40 in accordance with FIGS. 2 and 3. The winch cable or rope 45 passes over a pulley 46 mounted on the vehicle frame 40, and is releasably attached to the bottom end of the holder 20. Thereby, the bottom end of the holder 20 and the tire 10 can be readily lifted or lowered by a single operator to pivot the holder 20 between the horizontal position and the vertical position; the upper rollers 21 freely rolling in the rails 42. After pivoting downward, the rope 45 is detached.

After the running wheels 22 are lowered to the ground, the holder 20 can be stood up vertically, during which the two upper rollers 21 are removed from the rails 42. Standing on the two running wheels, the holder 20 can then be easily rolled on the wheels 22 in any direction to position the tire 10 in front of the bolts of an axle hub or brake drum.

After arriving at the proper place the feet 25 are screwed down to the ground by means of the handwheels 24. By further turning the handwheels 24 the two spindles 23 raise the wheel holder 20 until the wheel 11 is level with the hub fastening elements. The correct orientation of the wheel bolt openings can be achieved by rotating the tire 10 on the rollers 26, also without great exertion. The spare tire 10 can then be easily pushed onto the hub or brake drum studs and fastened thereto. The only disadvantage of the embodiment of FIGS. 1-3 is that the defective tire must be taken off without assitance, requiring a certain amount of lifting work by the person changing the tire.

In the embodiment according to FIGS. 4-6, this tire removal task is also made easier. The holder 50 includes two vertical guides 51, 52 mounted on a dolly or stationary frame 54 having two ground rolling wheels 53 mounted on the sides thereof. The guides 51, 52 are tubular and serve to guide sliding bars 55, 56 extending therethrough; the sliding bars being part of a vertically movable frame. On the dolly frame 54, there are two lower struts 57, 58 converging upwards, and on the upper free end of the sliding bars 55, 56, there are two upper struts 59, 60 converging downwards. Two tension springs 61 are attached between the apex of struts 57 and 58 and the apex of struts 59 and 60 for urging the bars 55, 56 downward, and a hydraulic jack 62 is mounted between the apexes of the upper and lower struts for raising the rods.

Two frame members 63, 64, which extend horizontally and bear one caster each on their free ends, are fastened on the dolly frame 54, as can be seen from FIGS. 5 and 6. Together with the wheels 53, these casters 65 constitute a support for letting the holder 50 stand alone.

At the lower end of the sliding bars 55, 56, under the guides 51, 52, two horizontally extending rollers 66 are mounted for supporting and carrying the tire 10. Bearing shafts for the rollers 66 are adjustably clamped to the sliding bars 55, 56 for permitting adjustment of the lowermost position of the rollers. On the upper ends of the sliding bars 55, 56 a crossbar 67 is rigidly fixed, and this crossbar serves as a mount for pivotal handle 68.

As FIG. 6 shows, the holder 50 is hung on the frame 40a of the vehicle chassis with the handle 68 secured in a conventional manner by means of a locking pin fastened on a chain on one side of the frame. On the other side of the frame there is mounted a hand winch 43 with a hand crank 44 and a rope or cable 45 (FIG. 5) which can be releasably attached to a hook 47 on a lower crossbar fixed on the lower ends of the rods 55, 56. By means of this winch, the holder 50 is pulled up and held under the vehicle. The wheel 10 can be secured on the holder against slipping by means of retention pins 69.

For changing tires the hand winch 43 is first operated to lower the holder 50 pivoting about the crossbar 67 until the wheels 53 are placed on the ground. After the handle 68 and the rope 45 are detached, the holder 50 and the spare tire 10 can be rolled on the wheels 53 to the location where the tire is to be changed. There the good tire is first rolled off the holder 50 and set to one side, and then the holder 50 is placed under the defective tire. With the hydraulic jack 62 the rods 55, 56 and carrier rollers 66 are raised until the rollers lie under the defective tire. Thereupon the nuts holding the defective tire are unscrewed, the defective tire is pulled from the hub bolts, and the carrier rollers 66 are lowered by discharging the pressure in the jack. The defective tire is rolled off the holder 50 to one side, and the good tire is rolled back onto the carrier rollers 66.

In the reverse order, this tire is raised by means of the jack 62, aligned with the hub bolts by rotating on the rollers 66, and secured. After the carrier rollers 66 are lowered, the defective tire is rolled onto the holder and moved by means of the holder to the storage place. After the rope 45 has been attached to the hook 47 and the handle 58 has been secured in an appropriate place, the holder 50 is pulled up by means of the hand crank 43.

Thus an operator need not exert himself beyond his capabilities in any phase of the task in order to change a defective tire on a vehicle.

What is claimed is:

1. An arrangement for facilitating changing tires on a vehicle, comprising a tire holder having means for supporting a tire in the holder, wheel means for rolling the holder with a tire therein on the ground and means for raising or lowering the tire supporting means relative to the wheel means, means for independently and stably supporting the tire holder in a vertical position on the ground; pivoted handle means, said pivoted handle means being pivotally attached at its opposite ends to the holder and to one side of the vehicle, said pivoted handle means being detachably secured at one of its ends to one of said holder and said vehicle, said pivoted handle means allowing vertical shifting of the tire holder while the upper portion of the tire holder is engaged to the vehicle, the tire holder having an operating length from the wheel means to said upper portion of the holder such that a distance between the ground and the point of attachment of the holder with the vehicle is at least equal to the operating length of the holder; and means operable on another side of the vehicle for lifting a lower end of the holder and for holding the holder in a generally horizontal orientation under the vehicle with the upper portion of the tire holder engaged to the vehicle, the tire holder being pivotable from a generally horizontal storage position beneath the vehicle to a vertical position on one side of the vehicle while the upper portion of the tire holder is attached to the vehicle.

2. An arrangement as claimed in claim 1 wherein the wheel means includes a pair of wheels positioned in spaced relationship relative to outer sides of the tire supporting means.

3. An arrangement as claimed in claim 1 wherein the supporting means includes a pair of spaced carrier rollers for supporting a tire.

4. An arrangement as claimed in claim 3 wherein the tire supporting means includes a movable frame having a part of vertical bars and with the carrier rollers mounted on the lower end of the movable frame, the means for raising and lowering the tire supporting means includes a stationary frame which is stationary with respect to the movable frame and on which the wheel means is mounted, and a pair of vertical tubular guides mounted on the stationary frame through which the respective vertical bars slidably extend.

5. An arrangement as claimed in claim 4 wherein the means for raising and lowering the tire supporting means includes at least one spring for urging the movable frame to a lower position relative to the stationary frame, and a hydraulic jack for raising the movable frame relative to the stationary frame.

6. An arrangement as claimed in claim 5 including two lower struts mounted on the stationary frame and which converge upward, and two upper struts mounted on the movable frame and which converge downwards, said spring and said jack being mounted and interposed between the apexes of the upper and lower struts.

7. An arrangement as claimed in claim 4 including a crossbar mounted across upper ends of the vertical rods, and said pivoted handle means being pivotally mounted on the crossbar, said pivoted handle means forming the upper portion of the holder for being detachably engaged to the vehicle.

8. An arrangement a claimed in claim 4 wherein the stationary frame includes horizontal members extending parallel to the carrier rollers, and the holder includes a pair of casters mounted on the distal ends of the horizontal members.

9. An arrangement as claimed in claim 1 wherein the means for lifting and lowering the lower end of the holder includes a winch having a rope or cable for detachably being engaged to the lower end of the holder.

10. An arrangement as claimed in claim 1 wherein the means for detachably engaging the upper portion of the holder to the vehicle is mounted on the underside of the vehicle, and the means for lifting includes means for pivoting the holder to raise a tire in the holder to a horizontal position underneath the vehicle.

* * * * *

UNITED STATES PATENT AND TRADEMARK OFFICE
CERTIFICATE OF CORRECTION

PATENT NO.  : 4,597,711

DATED       : July 1, 1986

INVENTOR(S) : Hanne Liebermann

It is certified that error appears in the above-identified patent and that said Letters Patent is hereby corrected as shown below:

Column 4, line 47, Claim 4, third line thereof, delete "part" and substitute therefor --pair--.

Signed and Sealed this

Eighth Day of September, 1987

Attest:

DONALD J. QUIGG

Attesting Officer

Commissioner of Patents and Trademarks